United States Patent
Esaka et al.

(10) Patent No.: US 8,578,455 B2
(45) Date of Patent: Nov. 5, 2013

(54) METHOD AND APPARATUS FOR AUTHENTICATING TERMINAL DEVICE, AND TERMINAL DEVICE

(75) Inventors: Naoki Esaka, Kanagawa (JP); Yoshimichi Tanizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 832 days.

(21) Appl. No.: 11/889,864

(22) Filed: Aug. 17, 2007

(65) Prior Publication Data

US 2008/0172724 A1 Jul. 17, 2008

(30) Foreign Application Priority Data

Jan. 11, 2007 (JP) ................................. 2007-003297

(51) Int. Cl.
*H04L 29/06* (2006.01)
(52) U.S. Cl.
USPC .............................................................. 726/5
(58) Field of Classification Search
None
See application file for complete search history.

(56) References Cited

U.S. PATENT DOCUMENTS

| 6,985,961 | B1 * | 1/2006 | Ramsayer et al. | 709/238 |
|---|---|---|---|---|
| 2006/0041742 | A1 * | 2/2006 | Oba | 713/151 |
| 2006/0083171 | A1 * | 4/2006 | Tanaike et al. | 370/238 |
| 2006/0095501 | A1 * | 5/2006 | Mochida | 709/203 |
| 2007/0136413 | A1 * | 6/2007 | Ishikawa et al. | 709/200 |
| 2007/0177548 | A1 * | 8/2007 | Oyama et al. | 370/331 |
| 2007/0178904 | A1 * | 8/2007 | Oyama | 455/445 |
| 2008/0155250 | A1 * | 6/2008 | Tanizawa et al. | 713/152 |
| 2008/0219241 | A1 * | 9/2008 | Leinonen et al. | 370/352 |

FOREIGN PATENT DOCUMENTS

JP 2005-339093 12/2005

OTHER PUBLICATIONS

PANA Working Group, PANA Framework draft-ietf-pana-framework-01, Jul. 16, 2004.*
Rosenberg et al.; "RFC 3261, SIP: Session Initiation Protocol", [online], retrieved from the internet, http://www.ietf.org/rfc/rfc3261.txt, pp. 1-269, (Jun. 2002).
U.S. Appl. No. 11/826,279, filed Jul. 13, 2007, to Tanizawa et al.

* cited by examiner

*Primary Examiner* — Shaun Gregory
(74) *Attorney, Agent, or Firm* — Finnegan, Henderson, Farabow, Garrett & Dunner, L.L.P.

(57) ABSTRACT

A receiving unit receives authentication information unique to a terminal device with identification information from the terminal device. An authenticating unit authenticates the terminal device based on the authentication information. An acquiring unit acquires setting information for relaying a communication between a plurality of terminal devices, which is associated with the identification information of an authenticated terminal device from the storing unit. A transmitting unit transmits the setting information to the relay apparatus via a number of communication paths determined in advance, which is smaller than the number of terminal devices.

9 Claims, 10 Drawing Sheets

| TERMINAL ID | SIP URI |
|---|---|
| A | sip:userA@aaa.example.com |
| B | sip:userZ@bbb.example.com |

151a

| IP ADDRESS | SIP URI |
|---|---|
| 192.168.1.1 | sip:userA@aaa.example.com |
| 192.168.1.10 | sip:userZ@bbb.example.com |

METHOD AND APPARATUS FOR AUTHENTICATING TERMINAL DEVICE, AND TERMINAL DEVICE

CROSS-REFERENCE TO RELATED APPLICATIONS

This application is based upon and claims the benefit of priority from the prior Japanese Patent Application No. 2007-3297, filed on Jan. 11, 2007; the entire contents of which are incorporated herein by reference.

BACKGROUND OF THE INVENTION

1. Field of the Invention

The present invention relates to a technology for performing a network access authentication of a terminal device using a signaling protocol.

2. Description of the Related Art

An authentication device called an authentication agent is currently in use, which performs a network access authentication for allowing a connection of a communication device to an internal network using a signaling protocol. Usually, the communication device cannot use various services provided in the internal network until the communication device is authenticated by the authentication agent. Some type of authentication devices performs a process of checking OS version, a process of checking update status of an antivirus pattern file, an antivirus quarantine process, and the like at the time of performing the authentication.

A session initiation protocol (SIP) is widely used as the signaling protocol for controlling and relaying a communication between communication devices. For example, an Internet protocol (IP) phone system using the Internet instead of a conventional telephone network is widely used as a communication system that employs the SIP (SIP system).

A standardized code for the SIP is disclosed in J. Rosenberg et al., "RFC 3261, SIP: Session Initiation Protocol", [online], June 2002, retrieved from the Internet: <http://www.ietf.org/rfc/rfc3261.txt>. For example, the above reference describes a SIP proxy that includes a SIP-message relaying function of relaying a SIP message, which has been transmitted from one terminal to another terminal, to a subsequent server. Furthermore, according to the above reference, an IP address or information on a SIP address called a SIP uniform resource identifier (URI) of the IP terminal needs to be registered on the SIP proxy, for the terminal to start using the SIP system.

However, with a conventional method that employs the SIP, because a registration process of registering address information to the SIP proxy is performed for each terminal after the terminal is authenticated by the authentication agent or the like, there is a problem that a processing load of the SIP proxy is increased.

For example, in a place such as an office or a call center, in which the IP phones are fixedly installed, because a large number of terminals are subjected to be turned ON with a start of daily work, the number of registration requests is increased, resulting in an increase of the processing load of the SIP proxy.

Although the above problem can be partially solved by decreasing or distributing a concentration of the processing load by randomly changing a time to be taken from a start up of the terminal to a start of the registration process or the like, there is another problem that a time for activating an entire system becomes longer.

If a transmission control protocol (TCP) is used instead of a user datagram protocol (UDP) as a transport protocol between the terminal and the SIP proxy, there are problems that the processing load of establishing a connection is increased and memory consumption is increased for storing connection information including a port number or the like.

Furthermore, when a transport layer security (TLS)/TCP is used for improving a security, more-complicated processes are necessary for a key exchange and the like, and there is a possibility that the processing load of the SIP proxy is further increased if the registration processes are concentrated.

SUMMARY OF THE INVENTION

According to one aspect of the present invention, an apparatus connectable to a terminal device via the first network and to a relay apparatus via a second network and performs an access authentication for the terminal device with respect to the second network, the relay apparatus registering thereon setting information for relaying a communication between a plurality of terminal devices connected to the first network and relaying the communication between the terminal devices, the apparatus includes a storing unit configured to store therein identification information for identifying the terminal device and the setting information in association with each other; a receiving unit configured to receive authentication information unique to the terminal device with the identification information from the terminal device; an authenticating unit configured to authenticate the terminal device based on the authentication information received by the receiving unit; an acquiring unit configured to acquire the setting information corresponding to the identification information of an authenticated terminal device from the storing unit; and a transmitting unit configured to transmit the setting information acquired by the acquiring unit to the relay apparatus via a number of communication paths determined in advance, wherein the number of communication paths is smaller than the number of terminal devices.

According to another aspect of the present invention, an authenticating method for an apparatus that is connected to a terminal device via the first network and to a relay apparatus via a second network and performs an access authentication for the terminal device with respect to the second network, the relay apparatus registering thereon setting information for relaying a communication between a plurality of terminal devices connected to the first network and relaying the communication between the terminal devices, the method includes storing identification information for identifying the terminal device and the setting information in association with each other; receiving authentication information unique to the terminal device with the identification information from the terminal device; authenticating the terminal device based on the authentication information received at the receiving; acquiring the setting information corresponding to the identification information of an authenticated terminal, device; and transmitting the setting information acquired at the acquiring to the relay apparatus via a number of communication paths determined in advance, wherein the number of communication paths is smaller than the number of terminal devices.

According to another aspect of the present invention, a terminal device connectable to an authentication device that performs an authentication and a relay apparatus that relays a communication via a network, the terminal device includes a first transmitting unit configured to transmit device authentication information for the authentication to the authentication device; a receiving unit configured to receive, from the authentication device, an authentication result obtained from the authentication information and setting-completion information indicating that the authentication device has transmitted setting information used for the relay apparatus to relay the communication to the relay apparatus; and a second transmitting unit configured to transmit the setting information to the relay apparatus, wherein when the receiving unit has not received the setting-completion information, the second transmitting unit transmits the setting information to the relay apparatus, and when the receiving unit has received the setting-completion information, the second transmitting unit does not transmit the setting information to the relay apparatus.

DETAILED DESCRIPTION OF THE INVENTION

Exemplary embodiments of the present invention are explained below in detail with reference to the accompanying drawings. However, the present invention is not limited to the embodiments.

An authentication device according to an embodiment of the present invention is configured to acquire setting information to be registered on a relay device for an authenticated terminal from a memory unit, and to register acquired setting information on the relay device on behalf of the terminal.

Figure 1:
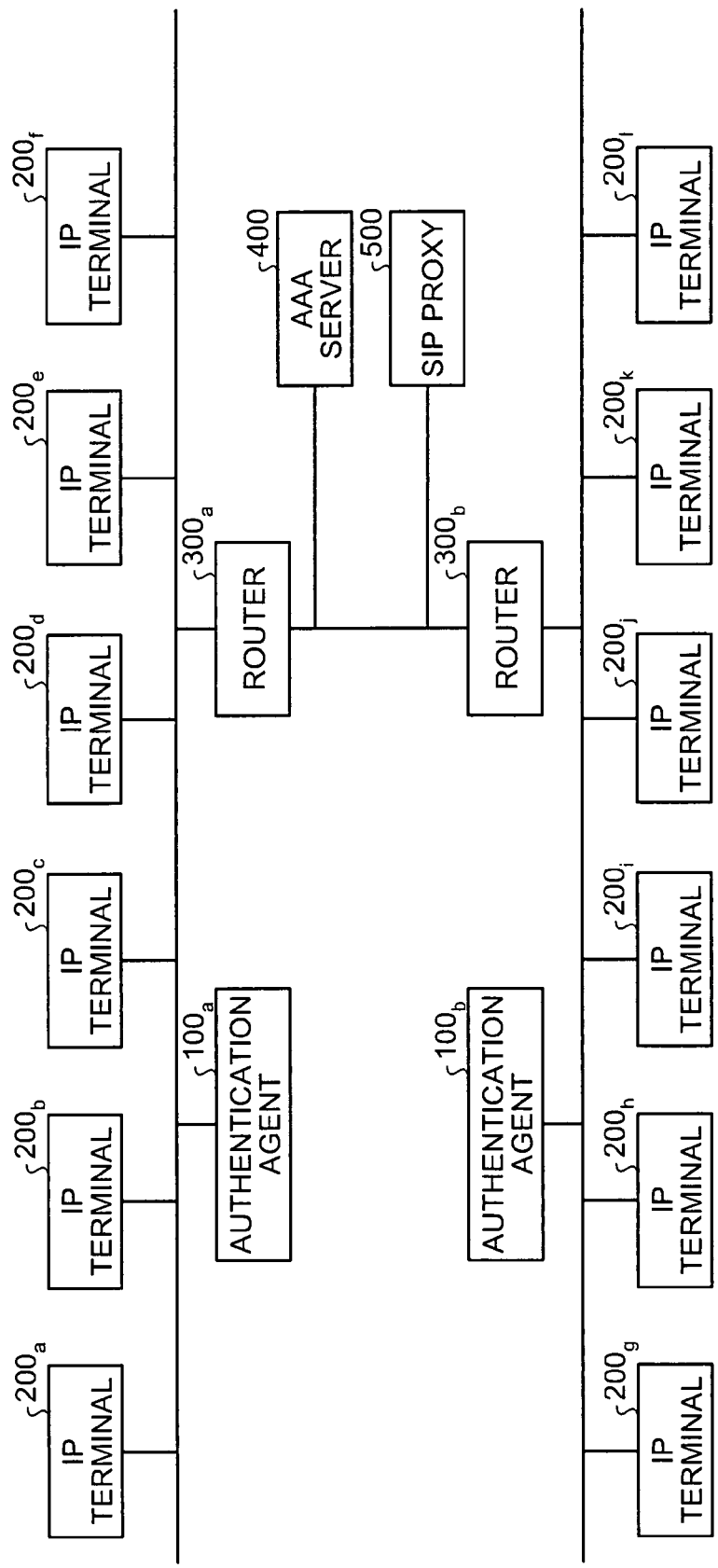
FIG. 1 is a block diagram of an entire communication system according to an embodiment of the present invention.

As shown in FIG. 1, the communication system according to the embodiment is constituted of IP terminals $200_a$ to $200_l$ (hereinafter, collectively described as "IP terminal 200" as appropriate), authentication agents $100_a$ and $100_b$ (hereinafter, collectively described as "authentication agent 100" as appropriate), routers $300_a$ and $300_b$ (hereinafter, collectively described as "router 300" as appropriate), an authentication authorization accounting (AAA) server 400, and a SIP proxy 500, connected with one another via a network.

Each of the IP terminals $200_a$ to $200_l$ employs the SIP as a signaling protocol, and has a SIP user agent (UA) function and an authentication client function as an authentication client to which network authentication is performed. Although twelve of the IP terminals 200 is employed in the example shown in FIG. 1, the number of the IP terminals 200 is not limited to twelve.

The authentication agent 100 receives a network authentication request from the IP terminal 200, and performs authentication of the IP terminal 200 in cooperation with the AAA server 400. Although an example is explained in which a protocol for carrying authentication for network access (PANA) is used as an access authentication protocol according to the embodiment, the access authentication protocol is not limited to PANA.

The authentication agent 100 checks a version of OS, checks an update of an antivirus pattern file, and performs a quarantine process as appropriate. According to the embodiment, the authentication agent 100 is configured in such a manner that the authentication agent $100_a$ performs an authentication of each of the IP terminals $200_a$ to $200_f$, the authentication agent $100_b$ performs an authentication of each of the IP terminals $200_g$ to $200_l$, and load sharing is realized between the authentication agent $100_a$ and the authentication agent $100_b$.

The router 300 relays a message transmitted from the IP terminal 200 to the SIP proxy 500. The router 300 can be configured with commercially available devices such as an IP router/switch. A filtering setting of the router 300 can be performed by the authentication agent 100. In this case, the authentication agent $100_a$ performs a setting of the router $300_a$ for the IP terminals $200_a$ to $200_f$, while the authentication agent $100_b$ performs a setting of the router $300_b$ for the IP terminals $200_g$ to $200_l$.

The AAA server 400 is an authentication server that performs an authentication process by an AAA protocol. The AAA server 400 basically includes functions similar to those in an authentication server used in the conventional method. It is also possible to configure the AAA server 400 to store therein setting information for a necessary registration for each terminal, as will be described later.

The SIP proxy 500 is a relay device for a SIP message, and serves as a SIP stateful proxy and a registrar.

Configurations of the IP terminal 200, the authentication agent 100, the router 300, the AAA server 400, and the SIP proxy 500 will be explained in detail later.

Figure 2:
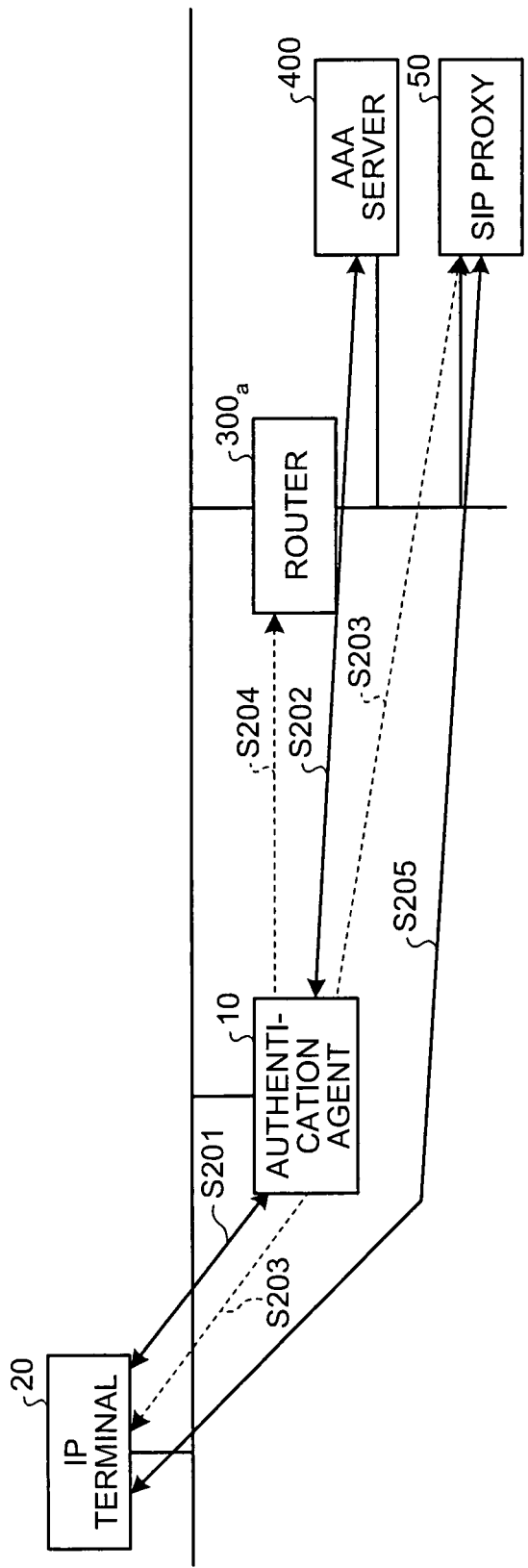
FIG. 2 is a schematic diagram for explaining a procedure of a registration process in a conventional communication system.

A concept of a SIP REGISTER process (registration process) performed by the communication system according to the embodiment is explained below. A concept and a disadvantage of a conventional registration process is firstly explained with reference to FIG. 2.

In the communication system employing a conventional SIP, an IP terminal 20 configured as a conventional terminal device sends an authentication request to an authentication agent 10 configured as a conventional authentication device (step S201).

The authentication agent 10 performs an authentication of the IP terminal 20 in cooperation with the AAA server 400 (step S202). The authentication agent 10 performs a quarantine process or the like if necessary.

After authenticating the IP terminal 20, the authentication agent 10 generates, in cooperation with the IP terminal 20, an encryption key used for a communication to a conventional SIP proxy 50, and notifies the encryption key to the SIP proxy 50 (step S203).

The authentication agent 10 performs a filter setting of the router 300 for the IP terminal 20 as appropriate (step S204).

The IP terminal 20, which has been enabled to access the SIP proxy 50 according to the above processes, establishes a TLS/TCP transport using the encryption key generated at step S203 and performs the SIP REGISTER process using an established transport (step S205).

Although a phase for generating the encryption key used for TLS/TCP is included in the above process because it is assumed that the TLS/TCP is used for the SIP, if the UDP or the TCP is used, which does not employ the TLS/TCP, it is not necessary to perform the process at step S203. In each case, however, because the SIP REGISTER process is performed to the SIP proxy 50 by each of the IP terminals 20 at step S205, a load of the SIP proxy 50 is disadvantageously increased because of a concentration of the processes.

Particularly, when the TLS/TCP is used, more complicated process is necessary at step S205 compared to a case in which the UDP or the TCP is singularly used. As a result, negative impact caused by an increased load of the SIP proxy 50 is increased.

Figure 3:
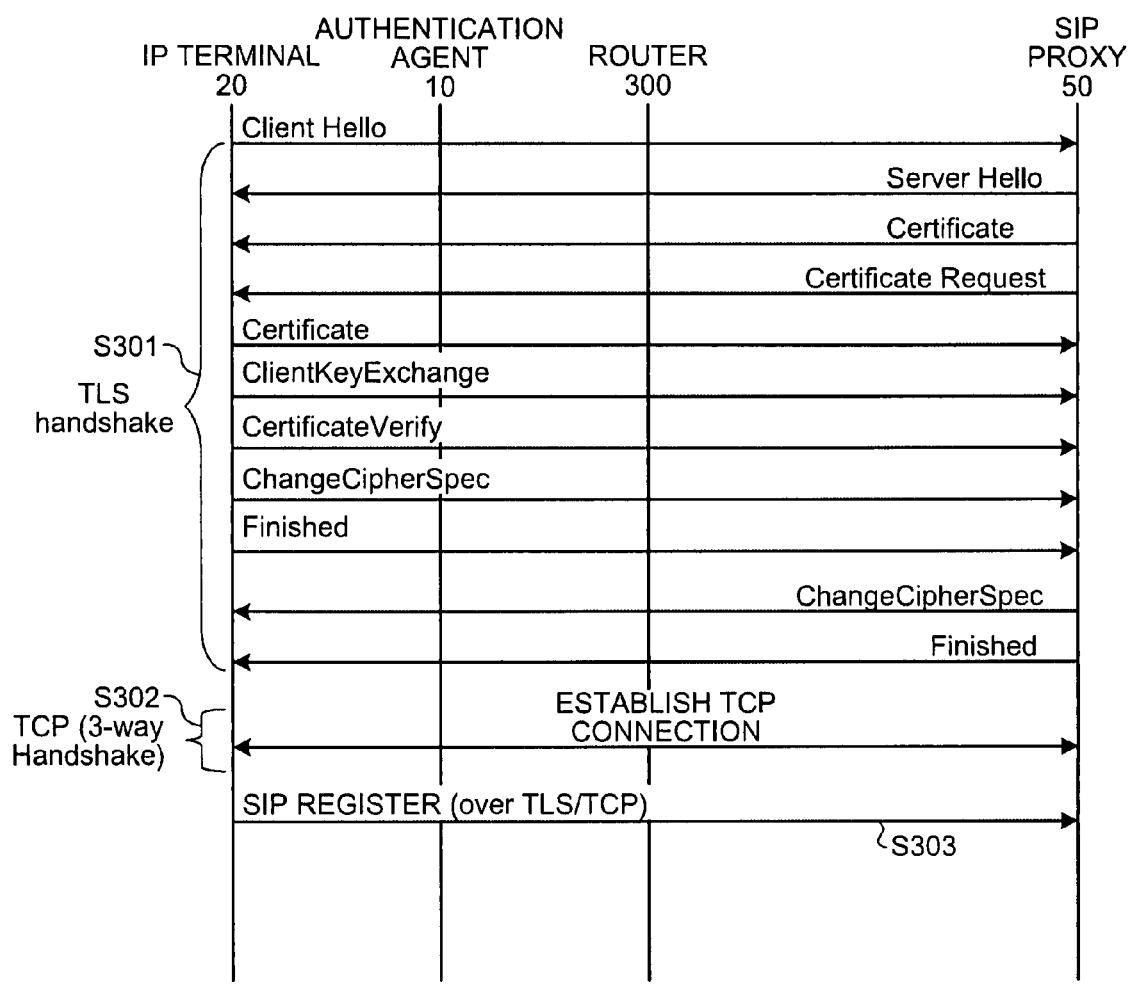
FIG. 3 is a schematic diagram for explaining a SIP REGISTER process using a TLS/TCP transport according to the embodiment.

As shown in FIG. 3, if the TLS/TCP is used, a TLS handshake process including a process of exchanging a key used in the TLS (step S301) and a TCP-connection establishment process (step S302) are required as a precondition to perform the SIP REGISTER process at step S303. At this state, if the TLS/TCP is used, a negative impact caused by the increased load of the SIP proxy 50 is increased due to a concentration of the SIP REGISTER processes, compared to a case in which the UDP is used.

Figure 4:
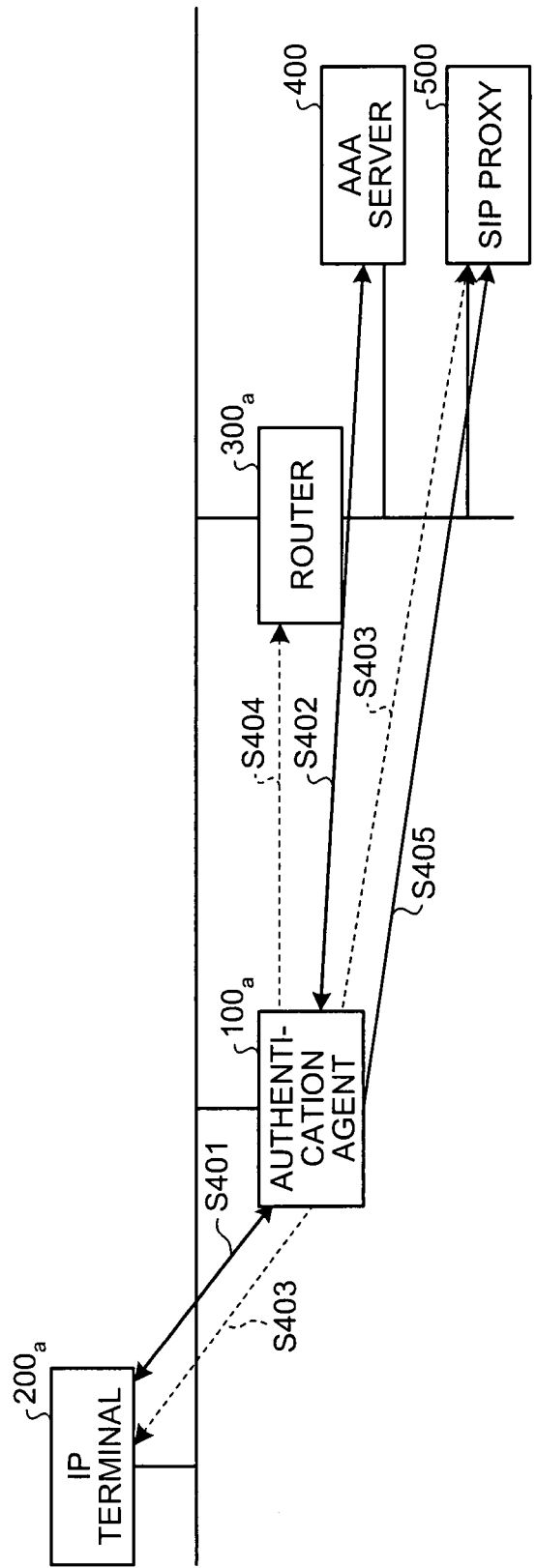
FIG. 4 is a schematic diagram for explaining a procedure of a registration process in the communication system according to the embodiment.

A procedure of the registration process performed by the communication system according to the embodiment is described with reference to FIG. 4. An authentication-request transmission process at step S401, an authentication process at step S402, a key-generation process at step S403, and a router setting process at step S404 are respectively same as the processes at steps S201 to S204 shown in FIG. 3.

The communication system according to the embodiment is different from the conventional communication system in that the IP terminal 200 does not perform a registration process with the SIP proxy 500 at step S405, and the authentication agent 100, which has acquired setting information stored in advance in the memory unit with respect to each terminal, performs the registration process on behalf of the IP terminal 200. The authentication agent 100 also performs a subsequent re-SIP REGISTER process on behalf of the IP terminal 200, so that it is possible to perform the de-REGISTER process in response to a failure or a termination of the network authentication.

Furthermore, because the IP terminal 200 needs not to perform the registration process to the SIP proxy 500, processes necessary for a SIP transport such as the TLS/TCP is not required. Therefore, it is possible to reduce a processing load of the SIP proxy 500.

In the registration process, information on an IP address is primarily required. In other words, other information such as key information of the TLS is a parameter needed mainly for maintaining a registration status, and not needed when the authentication agent 100 performs the registration process. In this case, the SIP proxy 500 needs not to store therein a parameter such as the key information, so that it is effective to reduce a consumption of a resource such as a memory.

Configurations of each of the above apparatuses, that is, the IP terminal 200, the authentication agent 100, the router 300, the AAA server 400, and the SIP proxy 500 are explained in detail below. The configuration of the IP terminal 200 is firstly described below.

Figure 5:
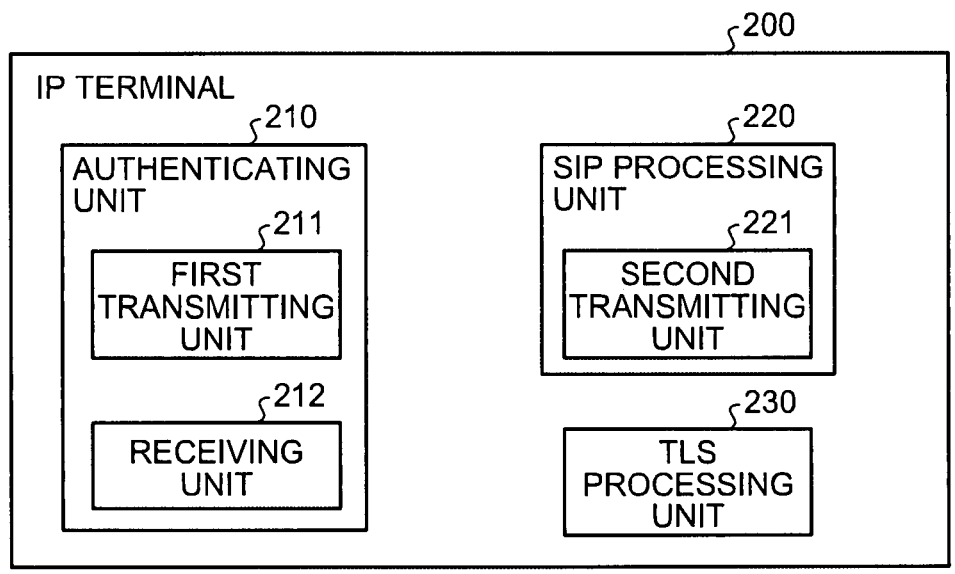
FIG. 5 is a block diagram of an IP terminal shown in FIG. 1.

As shown in FIG. 5, the IP terminal 200 includes an authenticating unit 210, a SIP processing unit 220, and a TLS processing unit 230.

The authenticating unit 210 realizes a PANA client function that is a function as a PANA authentication client (PaC), and includes a first transmitting unit 211 and a receiving unit 212.

The first transmitting unit 211 transmits authentication information to be used for an authentication in PANA (PANA authentication) for the authentication agent 100.

The receiving unit 212 receives a result of the PANA authentication from the authentication agent 100, and receives a PANA message extended to include information indicating that the authentication agent 100 performs the registration process on behalf of the IP terminal 200 (setting-completion information).

Figure 6:
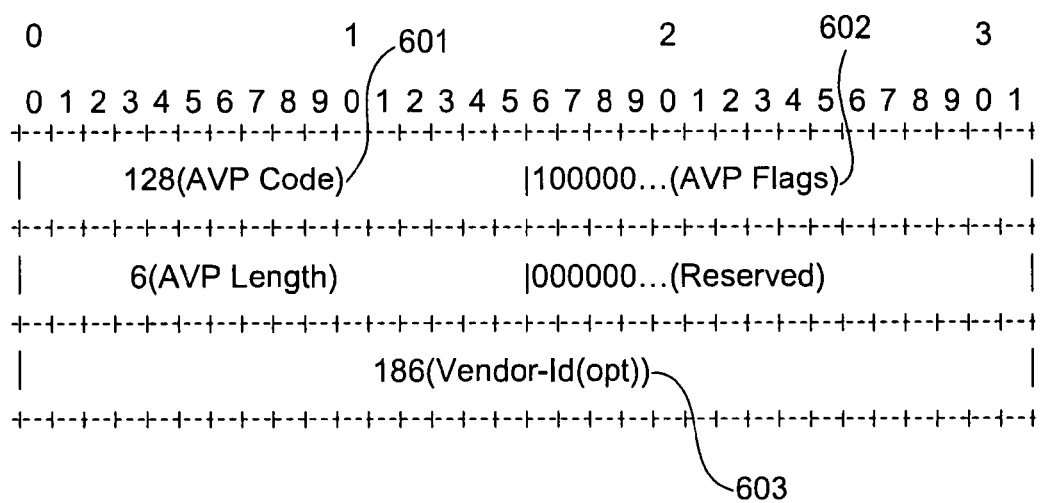
FIG. 6 is a schematic diagram of an example of a method of extending a protocol for carrying authentication for network access (PANA) message according to the embodiment.

FIG. 6 is a schematic diagram of an example of a format of an attribute value pair (AVP) in which the PANA message is extended by an AVP used for a data addition in PANA (extended AVP).

Specifically, an example is described in FIG. 6 in which the setting-completion information is notified with a vendor-id 603 and an AVP code 601. In other words, the IP terminal 200 determines that the SIP REGISTER process has already been performed by the authentication agent 100, based on the fact that the vendor-id 603 represents "186" while the AVP code 601 represents "128".

By setting a first bit of an AVP flags 602 (vendor-specific bit) to be "1", it is indicated that there is an optional vendor-id field. On the other hand, by setting a second bit of the AVP flags 602 (mandatory bit) to be "0", the extended AVP is to be ignored by a terminal device that cannot identify the extended AVP.

The above described method of extending a message is an example, and various methods can be applicable as long as it is possible to notify to the IP terminal 200 a fact that the authentication agent 100 has already been performed the registration process on behalf of the IP terminal 200.

The SIP processing unit 220 realizes a function as a SIP UA, and includes a second transmitting unit 221.

The second transmitting unit 221 performs the SIP REGISTER process by transmitting the register message to the SIP proxy 500. According to the embodiment, the second transmitting unit 221 is configured not to perform the registration process when the receiving unit 212 receives the setting-completion information.

The TLS processing unit 230 performs a process related to the TLS used as a SIP transport. For example, the TLS processing unit 230 extracts key information with the authentication agent 100, and performs a process of setting the key information to be used in a communication with the SIP proxy 500.

Figures 7, 8:
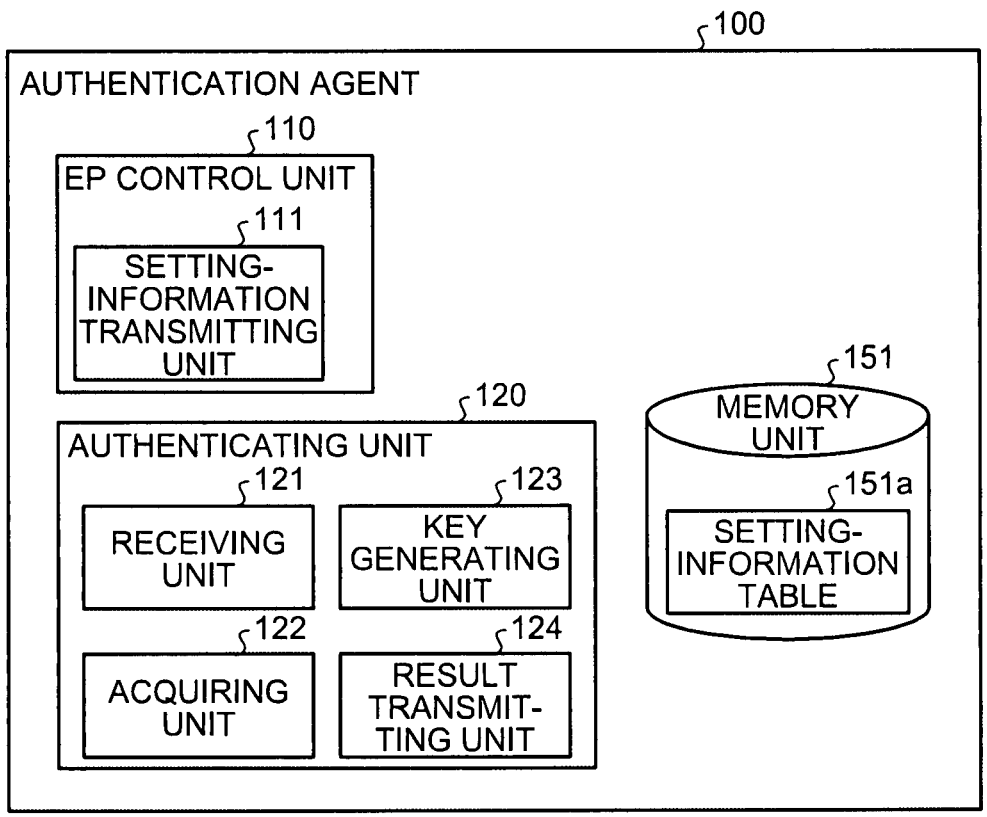
FIG. 7 is a block diagram of an authentication agent shown in FIG. 1.
FIG. 8 is a schematic diagram of an example of contents of a setting-information table shown in FIG. 7.

A configuration of the authentication agent 100 is described below. As shown in FIG. 7, the authentication agent 100 includes a memory unit 151, an enforcement point (EP) control unit 110, and an authenticating unit 120.

The memory unit 151 stores therein a setting-information table 151a that contains setting information to be registered on the SIP proxy 500 with respect to each of the IP terminals 200.

As shown in FIG. 8, the setting-information table 151a contains terminal ID and SIP URI associated with each other as identification information that identifies the IP terminal 200.

When the IP terminal 200 is authenticated, the setting-information table 151a is referred to by an acquiring unit 122 in the authenticating unit 120 for acquiring the SIP URI as the setting information of the IP terminal 200, based on the terminal ID included in the authentication information used for the authentication.

It is acceptable to configure in such a manner that the setting-information table 151a contains user ID that identifies a user and the like in association with the SIP URI, in addition to the terminal ID. In this case, corresponding SIP URI is acquired by the acquiring unit 122 using the user ID as another search key, which has been transmitted as the authentication information.

It is also possible to configure in such a manner that access control information is stored in the setting-information table 151a when there is the access control information to be set in the router 300.

The EP control unit 110 controls an EP of PANA. The EP is a device that performs a filtering of traffic in a data-link layer and/or an IP layer to be controlled by a PANA authentication agent (PAA), which is an authentication agent in PANA, and that can receive information on an authenticated client terminal and an encryption key from the PAA.

For example, if it is assumed that PaC is employed as a wireless terminal, EP is employed as an access point, and a PAA is provided in a network, and once the PaC is authenticated by the PAA, the PAA sets a filter to the EP using a simple network management protocol (SNMP) or a dedicated application program interface (API) to exclusively enable an authenticated PaC to pass through the EP. As a result, the PaC becomes connectable to the network. According to the embodiment, the router 300 works as the EP.

The EP control unit 110 also includes a setting-information transmitting unit 111. The setting-information transmitting unit 111 transmits setting information, which has been acquired by the acquiring unit 122 of the authenticating unit 120 from the memory unit 151, to the SIP proxy 500 to perform the registration process on behalf of the IP terminal 200. For example, the setting-information transmitting unit 111 transmits the SIP address in addition to the IP address of the IP terminal 200 to the SIP proxy 500 as the setting information. The SIP proxy 500 performs the SIP REGISTER process with a received SIP URI and a received IP address.

The authenticating unit 120 realizes a PAA function that is a function as an authentication server for PANA, and includes a receiving unit 121, the acquiring unit 122, a key generating unit 123, and a result transmitting unit 124.

The receiving unit 121 receives authentication information used for authentication from the IP terminal 200. The authenticating unit 120 performs authentication of the IP terminal 200 using the authentication information received by the receiving unit 121.

The acquiring unit 122 acquires setting information corresponding to the terminal ID of the IP terminal 200 authenticated from the setting-information table 151a.

The key generating unit 123 generates a shared key for a new communication (SIP communication) by exchanging an extensible authentication protocol (EAP) message in PANA.

The result transmitting unit 124 transmits a result of authentication performed by the authenticating unit 120 to the IP terminal 200. When the setting-information transmitting unit 111 transmits the setting information to the SIP proxy 500, the result transmitting unit 124 transmits a PANA message including the setting-completion information indicating that the setting information is already registered on the IP terminal 200.

Figure 9:
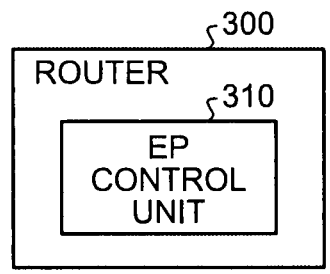
FIG. 9 is a block diagram of a router shown in FIG. 1.

A configuration of the router 300 is described. As shown in FIG. 9, the router 300 includes an EP control unit 310.

The EP control unit 310 receives an EP control for PANA. Specifically, the EP control unit 310 receives an instruction of a filter setting performed by the EP control unit 110 of the authentication agent 100, and performs the filter setting based on received instruction.

Figure 10:
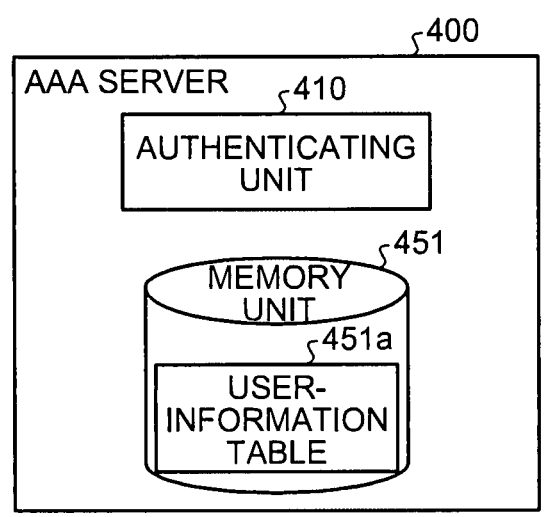
FIG. 10 is a block diagram of an authentication authorization accounting (AAA) server shown in FIG. 1.

A configuration of the AAA server 400 is described below. As shown in FIG. 10, the AAA server 400 includes a memory unit 451 and an authenticating unit 410.

The memory unit 451 stores therein a user-information table 451a that contains user information related to a user to be authenticated. The user-information table 451a contains, for example, user information in which a user ID that identifies a user and a password are associated with each other. The authenticating unit 410 performs a user authentication in cooperation with the authentication agent 100 based on the user information.

The information to be used for the authentication is not limited to the user ID and the password, and various pieces of information available for an authentication by EAP such as a digital certification or the like can be used.

The authenticating unit 410 performs an authentication of the IP terminal 200 in cooperation with the authenticating unit 120 of the authentication agent 100.

Although the AAA server 400 is configured separately from the authentication agent 100 because the authentication agent 100 is configured in a distributed manner according to the embodiment, if the authentication agent 100 is not configured in a distributed manner, it is possible to configure in such a manner that a function of the AAA server 400 is included in the authentication agent 100.

Figures 11, 12:
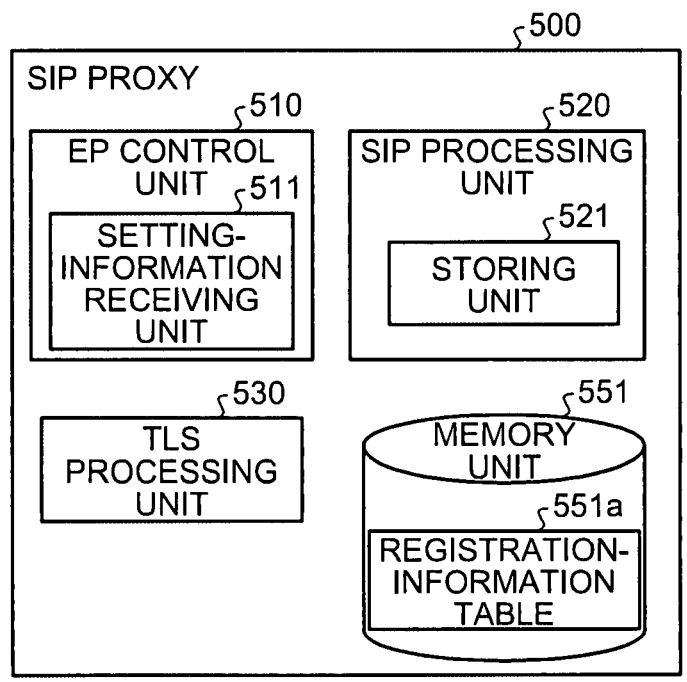
FIG. 11 is a block diagram of a SIP proxy shown in FIG. 1.
FIG. 12 is a schematic diagram of an example of contents of a registration-information table shown in FIG. 11.

A configuration of the SIP proxy 500 is described below. As shown in FIG. 11, the SIP proxy 500 includes a memory unit 551, an EP control unit 510, a SIP processing unit 520, and a TLS processing unit 530.

The memory unit 551 stores therein a registration-information table 551a that contains setting information registered by the SIP REGISTER process. As shown in FIG. 12, the registration-information table 551a contains IP address and SIP URI of the registered IP terminal 200, by associating with each other.

The EP control unit 510 receives an EP control for PANA, and includes a setting-information receiving unit 511. The setting-information receiving unit 511 receives setting information and key information necessary for the SIP REGISTER process from the setting-information transmitting unit 111 of the authentication agent 100.

The SIP processing unit 520 realizes a function as a SIP proxy server and a function of a SIP registrar. The SIP processing unit 520 includes a storing unit 521 that stores the setting information received by the setting-information receiving unit 511 in the registration-information table 551a. The SIP processing unit 520 can be configured to include a SIP-location server function.

The TLS processing unit 530 performs a process related to the TLS used as a SIP transport. For example, the TLS processing unit 530 acquires key information of the TLS generated by the authentication agent 100 and performs a setting so that the key information can be used for a communication with the IP terminal 200.

Each of the memory units 151, 451, and 551 can be configured with various recording media commercially used such as a hard disk drive (HDD), an optical disk, a memory card, a random access memory (RAM).

Figure 13:
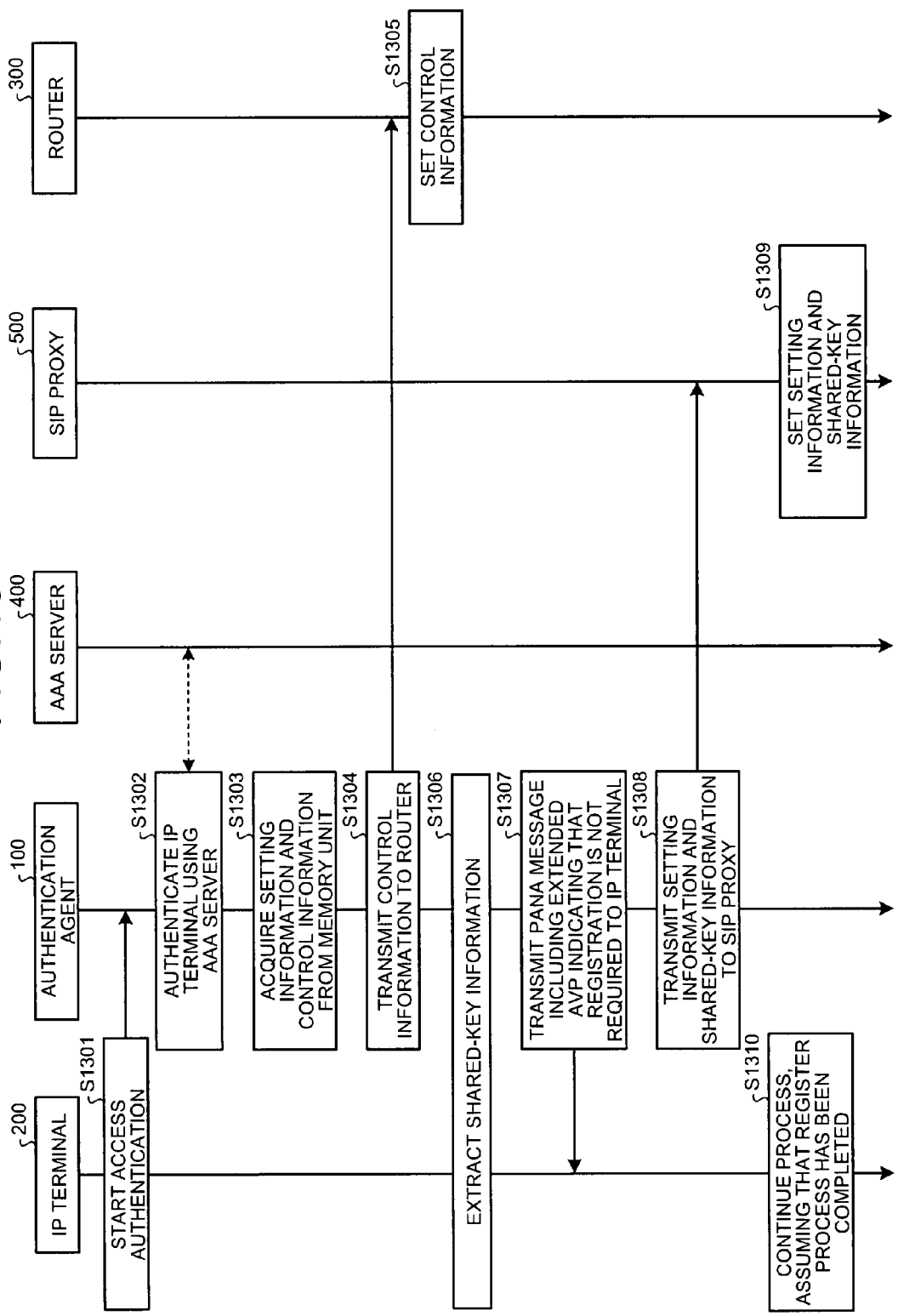
FIG. 13 is a sequence diagram for explaining an entire procedure of an authentication process according to the embodiment.

An authentication process performed by the authentication agent 100 configured as described above is explained with reference to FIG. 13.

The authenticating unit 210 of the IP terminal 200 starts a network access authentication to the authentication agent 100 (step S1301). Specifically, the authenticating unit 210 performs initiation of PANA, in which an initialization of a PANA session used for the authentication is performed. It is also possible to perform authentication process from the authenticating unit 120 of the authentication agent 100.

In this phase, the authenticating unit 120 of the authentication agent 100 transmits a PANA-Auth-request message to the IP terminal 200. The authenticating unit 210 of the IP terminal 200 receives the message and returns a PANA-Auth-answer message.

The authenticating unit 120 of the authentication agent 100 executes actual authentication process to perform an authentication of the IP terminal 200 using the AAA server 400 (step S1302). In this phase, a user/device authentication is started by exchanging the EAP message between the authentication agent 100 and the IP terminal 200.

Specifically, the first transmitting unit 211 of the IP terminal 200 transmits the EAP message including information necessary for the authentication to the authentication agent 100. The receiving unit 121 of the authenticating unit 120 receives the EAP message, and the authenticating unit 120 performs an authentication verification in cooperation with the authenticating unit 410 of the AAA server 400.

The acquiring unit 122 of the authentication agent 100 acquires setting information necessary for the SIP process from the setting-information table 151*a* of the memory unit 151 (step S1303). If there is control information for the router, the acquiring unit 122 acquires necessary control information from the setting-information table 151*a*.

It is possible to configure in such a manner that the setting information is stored in the AAA server 400 instead of the authentication agent 100. In this case, the acquiring unit 122 acquires corresponding setting information and control information from a setting-information table in the AAA server 400.

The EP control unit 110 of the authentication agent 100 transmits the control information acquired to the router 300 to perform a setting of the router 300 (step S1304). The EP control unit 310 of the router 300 receives the control information and performs a filter setting and the like based on the control information (step S1305).

The authenticating unit 210 of the IP terminal 200 and the key generating unit 123 in the authenticating unit 120 of the authentication agent 100 extracts shared-key information used for the SIP TLS/TCP by exchanging the EAP message (step S1306).

The result transmitting unit 124 of the authentication agent 100 notifies that the IP terminal 200 needs not to perform the registration process to the IP terminal 200 because the SIP REGISTER process is to be performed by the authentication agent 100 on behalf of the IP terminal 200 (step S1307).

Specifically, the result transmitting unit 124 transmits a PANA message including the extended AVP shown in FIG. 6 to the IP terminal 200. For example, the result transmitting unit 124 transmits the PANA message including a Result-Code AVP with the value PANA_SUCCESS indicating that an EAP authentication is succeeded with the extended AVP to the IP terminal 200.

The setting-information transmitting unit 111 of the authentication agent 100 transmits the shared-key information extracted at step S1306 and the setting information acquired at step S1303 to the SIP proxy via a secure communication path (step S1308). Specifically, the setting-information transmitting unit 111 transmits the setting information to the setting-information receiving unit 511 of the SIP proxy 500 and transmits the shared-key information to the TLS processing unit 530 of the SIP proxy 500.

The SIP proxy 500 performs a setting of each of the setting information and received shared-key information (step S1309). Specifically, the setting-information receiving unit 511 of the SIP proxy 500 receives the setting information, and the storing unit 521 of the SIP processing unit 520 stores received setting information in the registration-information table 551*a*, so that the SIP process is completed. The TLS processing unit 530 of the SIP proxy 500 receives the shared-key information and performs a setting process for a TLS/TCP communication.

The secure communication path between the authentication agent 100 and the SIP proxy 500 can be arbitral types. In each case, a process of establishing the communication path needs to be completed in advance. In this manner, according to the embodiment, the registration process can be performed as long as a communication path is established between the authentication agent 100 and the SIP proxy 500, which is advantageous compared to a conventional technology, in which the transport, such as the TLS, is required with respect to each path between the IP terminals 200 and the SIP proxy 500.

Number of the communication paths between the authentication agent 100 and the SIP proxy 500 is not limited to one, and, as long as the number of the communication paths is smaller than the number of the IP terminals 200, it is possible to omit processes necessary for the transport and to decrease resource consumption.

A process of notifying that the registration is not necessary to the IP terminal 200 is performed at step S1307 before performing the actual SIP REGISTER process at steps S1308 and S1309 because of the following fact.

For example, it is assumed that the IP terminal $200_b$ has already been authenticated and registered on the SIP proxy 500 and the IP terminal $200_a$ has been authenticated and processes are completed by step S1306.

At this state, if it is assumed that the registration process is performed (steps S1308 and S1309) without sending a notice indicating that the registration is not necessary (step S1307) and the IP terminal $200_a$ is already registered on the SIP proxy 500. In this case, upon receiving a connection request to the IP terminal $200_a$ from the IP terminal $200_b$ or from other IP terminals 200, there is a possibility that the IP terminal $200_a$ cannot perform a SIP communication because the IP terminal $200_a$ has not received the notice indicating that the registration is not necessary.

Furthermore, in the above situation, because the IP terminal $200_a$ cannot know that the SIP communication has not succeeded and cannot notify a failure to the IP terminal $200_b$, there is a possibility that the IP terminal $200_b$ determines that the IP terminal $200_a$ is unstable.

On the other hand, if the registration processes at steps S1308 and S1309 are performed after sending the notice indicating that the registration is not necessary at step S1307, even if the IP terminal $200_a$ is not in a REGISTER state for the SIP proxy 500, the IP terminal $200_a$ can detect that the SIP communication cannot normally performed. Therefore, it is possible to examine a cause whether there is a problem with the authentication or there is a problem with the setting of the SIP proxy 500.

Referring back to FIG. 13, the IP terminal 200, which has received the notice indicating that the registration is not necessary at step S1307, determines that the SIP REGISTER process has been completed, and performs the SIP communication without performing the SIP REGISTER process as long as the IP terminal 200 is authenticated by the authentication agent 100 (step S1310).

The SIP REGISTER process at step S1308 is performed not only when initial authentication on PANA is performed but also when keep-alive process on PANA is performed for maintaining a session with the IP terminal 200 authenticated in PANA. Accordingly, it is possible for the IP terminal 200 not to perform the SIP REGISTER process and the re-SIP REGISTER process as long as the IP terminal 200 is authenticated. In other words, the network authentication and the SIP REGISTER process can be conjugated according to the embodiment.

As described above, with the authentication device according to the embodiment, it is possible to acquire the setting information to be registered on the relay device for an authenticated terminal when the terminal is authenticated, and to register acquired setting information on the relay device, on behalf of the terminal. Accordingly, even if the relay device receives requests for performing the registration process in an concentrated manner, it is possible to prevent an increase of processing load of the relay device.

Figure 14:
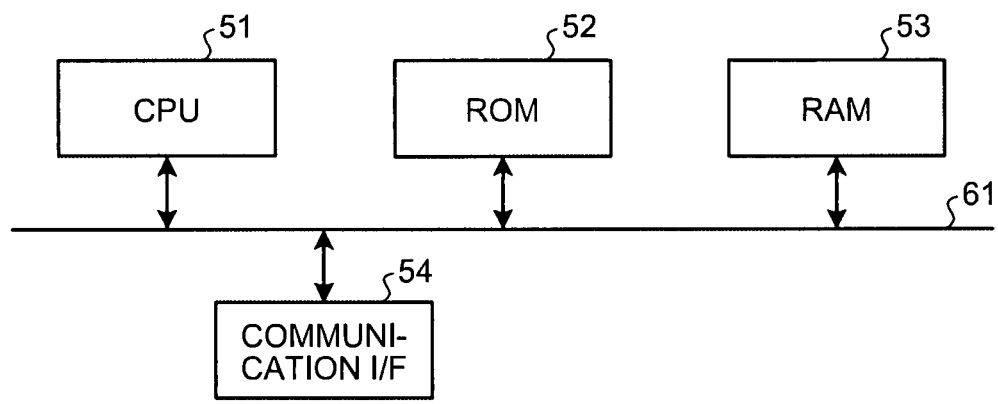
FIG. 14 is a schematic diagram of hardware of an authentication device according to the embodiment.

A hardware configuration of the authentication device according to the embodiment is explained with reference to FIG. 14.

The authentication device according to the embodiment includes a control device such as a central processing unit (CPU) 51, a memory device such as a read only memory (ROM) 52 and a RAM 53, a communication I/F 54 that performs communication in connection with a network, an external memory unit such as an HDD, compact disk (CD), and a drive device, an input device such as a keyboard and a mouse, and a bus that connects each of the above components, and has a hardware configuration using a general computer terminal.

An authentication program to be executed on the authentication device according to the embodiment is configured in such a manner that the program is provided as such stored in a computer readable recording medium such as a CD-ROM, a flexible disk (FD), a CD-R (recordable), or a digital versatile disk (DVD), with a file in an installable format or in an executable format.

On the contrary, it is possible to configure in such a manner that the authentication program to be executed by the authentication device according to the embodiment is stored in a computer terminal connected to the network such as the Internet, and provided when the authentication program is downloaded via the network.

It is also possible to provide the authentication program according to the embodiment by previously storing the authentication program in an ROM or the like.

The authentication program to be executed by the authentication device according to the embodiment has a module configuration including the above described units (the EP control unit and the authenticating unit). As actual hardware, the above described units are loaded on a main memory device when the CPU 51 (processor) reads the authentication program from the above recording medium and executes read program, and each of the units is generated on the main memory device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus connectable to a plurality of terminal devices via a first network and to a relay apparatus via a second network and performs an access authentication for the terminal devices to allow access of those terminal devices directly and individually to the first network, using the second network to communicate with the relay apparatus, the relay apparatus relaying a communication between the plurality of terminal devices connected to the first network, the apparatus comprising:

a storing unit configured to store therein identification information for identifying the terminal devices and setting information for each, the setting information to be registered on the relay apparatus;

a receiving unit configured to receive identification information and authentication information unique to a terminal device from the terminal device seeking access to said first network;

an authenticating unit configured to authenticate the terminal device based on the authentication information received by the receiving unit;

an acquiring unit configured to acquire the setting information corresponding to the identification information of an authenticated terminal device from the storing unit;

a transmitting unit configured to transmit the setting information acquired by the acquiring unit to the relay apparatus over the second network using a number of communication paths determined in advance, wherein the number of communication paths is smaller than the number of terminal devices; and a result transmitting unit configured to transmit setting-completion information to the terminal device, the setting-completion information indicating that the transmitting unit has transmitted the setting information to the relay apparatus for access of the terminal device to said first network, wherein the transmitting unit further transmits the setting information to the relay apparatus when a keep-alive process is performed, the keep-alive process being a process that maintains a session with the authenticated terminal device.

2. The apparatus according to claim 1, wherein an external device is connected to the apparatus via the second network, the external device storing therein the identification information and the setting information in association with each other, and the acquiring unit is configured to transmit the identification information of the authenticated terminal device to the external device, and to acquire setting information returned from the external device in response to transmitted identification information.

3. The apparatus according to claim 1, wherein the storing unit is configured to store therein the identification information and address information to be registered on the relay apparatus as the setting information in association with each other, the acquiring unit is configured to acquire the address information corresponding to the identification information of the authenticated terminal device from the storing unit; and the transmitting unit is configured to transmit the address information acquired by the acquiring unit to the relay apparatus.

4. The apparatus according to claim 3, wherein the storing unit is configured to store therein the identification information and a session initiation protocol uniform resource identifier to be registered as the address information with a session-initiation-protocol register method of the session initiation protocol in association with each other, the acquiring unit is configured to acquire the session initiation protocol uniform resource identifier corresponding to the identification information of the authenticated terminal device, and the transmitting unit is configured to transmit the session initiation protocol uniform resource identifier acquired by the acquiring unit to the relay apparatus.

5. The apparatus according to claim 4, wherein the transmitting unit is configured to transmit the session initiation protocol uniform resource identifier acquired by the acquiring unit to the relay apparatus at fixed time intervals.

6. The apparatus according to claim 1, further comprising a generating unit configured to generate first key information for a communication between the relay apparatus and the terminal device, wherein the transmitting unit is configured to transmit the first key information generated by the generating unit as the setting information to the relay apparatus, upon the terminal device being authenticated.

7. The apparatus according to claim 6, wherein the authenticating unit is configured to generate second key information for a transport layer security for the communication between the relay apparatus and the terminal device.

8. The apparatus according to claim 1, wherein the result transmitting unit is further configured to transmit an authentication result obtained from the authentication information to the terminal device.

9. An authenticating method for an apparatus that is connected to a plurality of terminal devices via a first network and to a relay apparatus via a second network and performs an access authentication for the terminal devices to allow access of those terminal devices directly and individually to the first network, using the second network to communicate with the relay apparatus, the relay apparatus relaying a communication between the plurality of terminal devices connected to the first network, the method comprising:

storing identification information for identifying the terminal devices and setting information for each, the setting information to be registered on the relay apparatus;

receiving identification information and authentication information unique to a terminal device from the terminal device seeking access to said first network;

authenticating the terminal device based on the authentication information received at the receiving;

acquiring the setting information corresponding to the identification information of an authenticated terminal device;

transmitting the setting information acquired at the acquiring to the relay apparatus over the second network using a number of communication paths determined in advance, wherein the number of communication paths is smaller than the number of terminal devices;

transmitting setting-completion information to the terminal device, the setting-completion information indicating that the apparatus has transmitted the setting information to the relay apparatus for access of the terminal device to said first network; and transmitting the setting information to the relay apparatus when a keep-alive process is performed, the keep-alive process being a process that maintains a session with the authenticated terminal device.

* * * * *